United States Patent [19]

Lishevskaya et al.

[11] 3,821,137

[45] June 28, 1974

[54] GRAFT COPOLYMERS OF CELLULOSE AND POLYACRYLTHIOAMIDE, METHOD OF THEIR PRODUCTION AND APPLICATION

[76] Inventors: Marina Osipovna Lishevskaya, ulitsa Novatorov, 40, korpus II, kv. 46.; Alexandr Davidovich Virnik, Nagatinskaya ulitsa, 40, korpus 2, both of Moscow; Genrikh Aramaisovich Gabrielian, ulitsa Dispansera 32b, kv. 49, Mytischi Moskovskaya oblast; Zakhar Alexandrovich Rogovih, Donskaya ulitsa, 24, kv. 68., Moscow; Vladimir Fedorovich Borbat, ulitsa 50-letiya Oktyabrskoi revoljutsii, I, kv. 31., Norilsk; Alexandr Mikhailovich Orlov, ulitsa Nansena, 50, kv. 85., Norilsk; Mirriam Borisovna Ferberg, Leninsky prospekt, 28, kv. 181., Norilsk; Nina Ivanovna Markelova, ulitsa Kirova, 29, kv. 155., Norilsk, all of U.S.S.R.

[22] Filed: Sept. 20, 1972

[21] Appl. No.: 290,519

Related U.S. Application Data

[62] Division of Ser. No. 48,518, June 22, 1970, Pat. No. 3,728,103.

[52] U.S. Cl............ 260/17.4 GC, 8/194, 8/DIG. 11, 8/DIG. 13, 8/DIG. 18, 260/2.2 R, 260/857, 260/879, 260/881, 260/898
[51] Int. Cl...................... C08b 23/00, C08f 27/06
[58] Field of Search............ 260/17.4 GC, 879, 881, 260/898, 857; 8/194, DIG. 11, DIG. 13, DIG. 18

[56] References Cited
UNITED STATES PATENTS

| | | | |
|---|---|---|---|
| 2,338,177 | 1/1944 | Graenacher | 8/194 |
| 3,357,933 | 12/1967 | Faessinger | 260/17.4 |
| 3,484,390 | 12/1969 | Bauman | 260/2.2 |
| 3,696,092 | 10/1972 | Giuliana | 8/194 |

FOREIGN PATENTS OR APPLICATIONS
938,880  10/1963  Great Britain........................ 75/101

OTHER PUBLICATIONS
Zhurnal Prikladnoi Khimii, 1969, 42, No. 1, 170–174, "Mechanism of the Hydrolysis of Cyanoethyl Cellulose in Alkaline Medium."

*Primary Examiner*—William H. Short
*Assistant Examiner*—Edward Woodberry
*Attorney, Agent, or Firm*—Waters, Roditi, Schwartz & Nissen

[57]  ABSTRACT

The present invention relates to new compounds which are graft copolymers of cellulose and polyacrylthiomide with the general formula

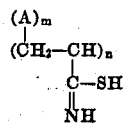

wherein
A is cellulose $m$ is the degree of polymerization of cellulose ranging from 150 to 2,000
$n$ is the degree of polymerization of polyacrylthiomide ranging from 400 to 4,000; method of producing these new compounds and to application thereof.

The method of producing said compounds resides in treating graft polymers of cellulose and polyacrylonitrile with hydrogen sulphide or with salts of hydrosulphuric acid in an aqueous or an organic medium at a temperature of 60°–100° C and subsequently isolating the target product.

The herein-proposed compounds can find application as electron-exchange complex-forming materials in chemical industry, metallurgy and in other industries.

6 Claims, No Drawings

GRAFT COPOLYMERS OF CELLULOSE AND POLYACRYLTHIOAMIDE, METHOD OF THEIR PRODUCTION AND APPLICATION

This Application is a division of Application Ser. No. 48,518 filed June 22, 1970, now U.S. Pat. 3,728,103.

The present invention relates to graft copolymers of cellulose and polyacrylthioamide and graft copolymers of synthetic polymers and polyacrylthioamide. And to a methods of their production.

These compounds find application in the chemical industry for purifying waste water from mercury ions, in metallurgy for selective extraction of ions of noble metals from industrial waste solutions, and in other branches of industry.

According to the invention, these new compounds, viz., graft copolymers of cellulose or of synthetic polymers and polyacrylthioamide, have the following general formula:

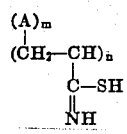

wherein
A is cellulose or a synthetic polymer,
$m$ is the degree of the polymerization of cellulose or the degree of polymerization of the synthetic polymer and is in the range of 150–2,000,
$n$ is the degree of polymerization of polyacrylthioamide and is between 400–4,000.

A graft copolymer of cellulose and polyacrylthioamide is a fibrous material, fabric or powder, which is dark yellow in color, features hydrophilic properties close to those of cellulose materials, and is stable to temperatures up to 140° C.

The molecular weight of the main chain is 20,000 – 3,000,000. The molecular weight of the side chain of polyacrylthioamide is 20,000–200,000.

Graft copolymers of synthetic polymers and polyacrylthioamide, such as a graft copolymer of polyvinyl alcohol and polyacrylthioamide, or a graft copolymer of polycaproamide and polyacrylthioamide, or a graft copolymer of a polyolefine and polyacrylthioamide, and the like, have the form of fibres fabrics or granules whose color ranges from bright yellow to dark yellow. These compounds are stable at temperatures within a range of from 100° to 150° C.

The molecular weight of the main chain of the graft copolymer of polyvinyl alcohol and polyacrylthioamide ranges from 80,000 to 150,000, that of the side chain, from 20,000 to 200,000.

The molecular weight of the main chain of the graft copolymer of polycaproamide and polyacrylthioamide ranges from 10,000 to 20,000, that of the side chain, from 20,000 to 200,000.

The molecular weight of the graft copolymer of a polyolefine and polyacrylthioamide ranges from 6,000 to 300,000, that of the side chain, from 20,000 to 200,000.

According to the invention, the method of producing said graft copolymers of cellulose or synthetic polymers and polyacrylthioamide comprises treating graft copolymers of cellulose or synthetic polymers and polyacrylonitrile with hydrogen sulphide or with salts of hydrosulphuric acid in an aqueous or organic medium at a temperature of 60°–100° C with subsequent isolation of the final product.

The process is preferably carried out in an aqueous medium at a pH not over 8.

If the process is to be carried out in an aqueous medium, sodium and ammonium sulphides and hydrosulphides should be preferably used as salts of hydrosulphuric acid, whereas, in case the process is to be carried out in an organic medium, preference should be given to ammonium hydrosulphides.

It is preferable that dimethyl formamide, dioxane, or ethyl alcohol is used as an organic solvent.

The method is effected as follows.

Graft copolymers of cellulose or synthetic polymers with polyacrylonitrile, with the content of polyacrylonitrile therein ranging from 10 to 70 weight percent, are reacted with hydrogen sulphide or with salts of hydrosulphuric acid. The process is carried out at a temperature of 60°–100° C.

This process can be carried out either in an aqueous or in the organic medium. As an organic solvent use can be made of dimethyl formamide, dimethyl sulphoxide, dimethyl acetamide ethylene carbonate, dioxane, alcohols, and other solvents. It is preferably to use dimethyl formamide, dioxane, or ethyl alcohol for this purpose.

It is likewise preferable that sodium or ammonium sulphides and hydrosulphides be used as salts of hydrosulphuric acid.

When carrying out the process in an aqueous medium, it is desirable that the pH value should not exceed 8. This is achieved by adding a phosphate buffer (monobasic sodium or potassium phosphate). The duration of the process is 2–10 hours. The resulting final product features a sulphur content of 3 to 29 wt. percent, electron-exchange capacity of from 1 to 9 m.eqv./8 and a degree of conversion of nitrile groups to thioamide groups of 20 to 80 percent.

When the final product is heated with a 0.5N solution of sulphuric acid at 100° over a period of 4 hrs, its sulphur content and electron-exchange capacity do not change. When the final product is heated with a 0.5N solution of caustic soda at 100° C over a period of 4 hrs, its sulphur content and electron-exchange capacity become diminished by 5 to 25 percent.

The obtained products are resistant to air oxidation and can withstand prolonged storage in the open air without preliminary reduction thereof prior to utilization.

The present method allows the use as stock materials of waste products resulting in the production of synthetic fibres, films, plastics and polymers, which do not comply with the adopted standards and cannot be employed for the purpose they have been initially produced. According to the herein-proposed method the target products can be obtained in the form of fibres, fabrics, films, nonwoven materials, powders and granules which makes it possible to broaden the range of their application and that of the equipment involved.

Graft copolymers of cellulose or synthetic polymers and polyacrylthioamide produced by the present method feature electron-exchange and complex-forming properties and, according to the invention, are employed as electron-exchange complex-forming materials, for example, for purifying industrial waste solutions from mercury ions.

This process is effected by filtering industrial waste solutions that contain mercury ions at a concentration of 5–100 mg/l by passing them through the herein-proposed electron-exchange complex-forming material at a temperature of 20°–95° C and a pH of 5–7. The material effects complete sorption of the mercury ions. Mercury is recovered by burning the fibres of the graft copolymer employed and subsequent condensation of mercury vapors.

The application of said materials enables substantial purification of industrial waste solutions (the residual amount of mercury therein not exceeding 0.005 mg/l).

Said electron-exchange complex-forming materials are also applicable for selective removal of noble metals from industrial solutions, the content of noble metals therein being from 0.001 to 10 g/l, and that of nonferrous metals, from 1 to 300 g/l.

The process is effected by passing such solutions through an adsorbing column filled with the ion-exchange complex-forming material, either with heating to 90°–95° C, or at room temperature.

The material with chemically bound metal is separated by filtration, washed with water, dried and calcined at 700° C, with the obtaining of the metals in the form of a powder.

For separating platinum and palladium from iridium, rhodium and ruthenium, the initial solution is passed through an adsorbing column at room temperature, whereby platinum and palladium are subjected to sorption, whereupon the resulting filtrate is passed through the next adsorbing column at a temperature of 90°–95° C with the collection of iridium, rhodium and ruthenium. This method allows complete removal of noble metals, which effect cannot be achieved by using the now-existing methods (such as carbonization, extraction with organic solvents, etc.).

For a better understanding of the present method of producing graft copolymers of cellulose or of synthetic polymers and polyacrylthioamide the following examples are given hereinbelow by way of illustration.

Example 1

20 g of a graft copolymer of cellulose and polyacrylonitrile (in the form of a fibre or fabric) which contains 22 wt percent of graft polyacrylonitrile (5.8 wt. percent of nitrogen) is treated over a period of 6 hrs in a hermetically sealed apparatus at a temperature of 80° C with 600 ml of a 45 percent aqueous solution of hydrogen sulphide. The final product is washed with water and dried.

The target product features a sulphur content of 3.45 wt. percent an electron-exchange capacity of 1.1 m.eqv./g (for $Ag^+$), and degree of conversion of nitrile groups to thioamide groups amounting to 26 percent of theoretical.

Example 2

20 g of a graft copolymer of cellulose and polyacrylonitrile in the form of fibre or fabric, comprising 35 wt. percent of graft polyacrylonitrile (9.2 wt. percent of nitrogen), are treated during 6 hrs in a hermetically sealed apparatus at a temperature of 100° C with 600 ml of a 3.6 percent solution of hydrogen sulphite in dimethyl formamide. Then the fibre is washed with water and dried. The target product features a sulphur content of 14.6 wt. percent, an electron-exchange capacity of 4.5 m.eqv./g (for $Ag^+$) and a degree of conversion of nitrile groups to thioamide groups equal to 70 percent of theoretical.

Example 3

20 g of a graft copolymer of cellulose and polyacrylonitrile, containing 50 wt. percent of graft polyacrylonitrile (13.2 wt. percent of nitrogen) are treated with 600 ml of a 6 percent aqueous solution of sodium sulphide at a pH of 7.5–8 during 4 hrs at a temperature of 80° C in a hermetically sealed apparatus. For maintaining the pH value at 7.5–8, a phosphate buffer (monobasic sodium phosphate) is added to the reaction mixture.

The obtained product is washed with water and dried. The product contains 11.82 wt. percent of sulphur, its electron-exchange capacity is 3.5–3.7 m.eqv./g (for $Ag^+$), and the degree of conversion of nitrile groups to thioamide groups is 64.1 percent of theoretical Example 4

20 g of a graft copolymer of polyvinyl alcohol and polyacrylonitrile, containing 54.5 wt. percent of polyacrylonitrile (14.38 wt. percent of nitrogen) are treated with 600 ml of a saturated solution of ammonium hydrosulphide in dioxane during 4 hrs at a temperature of 60° C in a hermetically sealed apparatus.

The obtained product is washed with water and dried. In the resulting product the sulphur content is 6.4 wt. percent, the electron-exchange capacity is 2 m.eqv./g (for $Ag^+$), and the degree of conversion of nitrile groups to thioamide groups is 26.2 percent of theoretical.

Example 5

20 g of a graft copolymer of polycaproamide and polyacrylonitrile, containing 52.4 wt. percent of graft polyacrylontrile, are treated with 600 ml of a 30 percent aqueous solution of ammonium hydrosulphide in a hermetically sealed apparatus at 70° C during 3 hrs.

The obtained product is washed with water and dried.

Sulphur content is 6.9 wt. percent, electron-exchange capacity, 3.05 m.eqv./g (for $Ag^+$).

Degree of conversion of nitrile groups to thioamide groups is 39.4 percent of theoretical.

Example 6

20 g of a graft copolymer of polyethylene and polyacrylonitrile, containing 36.3 wt. percent of graft polyacrylonitrile are treated with 600 ml of a 10 percent aqueous solution of sodium sulphide in the presence of a phosphate buffer which is monobasic sodium phosphate (pH = 7.5–8) at a temperature of 70° C during 4 hrs.

The obtained product is washed with water and dried.

Sulphur content is 3.67 wt. percent, electron-exchange capacity of the product (for $Ag^+$) is 2.14 m.eqv./g.

Degree of conversion of nitrile groups to thioamide groups is 13.5 percent of theoretical.

Example 7

20 g of a graft copolymer of polyethylene and polyacrylonitrile, comprising 36.3 wt. percent of polyacrylonitrile are treated with 600 ml of a 30 percent solution of ammonium hydrosulphide in dimethyl formamide at a temperature of 80° C during 4 hrs.

The obtained product is washed with water and dried.

Its sulphur content is 13.35 wt. percent, electron-exchange capacity (for $Ag^+$) is 5.1 m.eqv./g, and degree of conversion of nitrile groups to thioamide groups is 80 percent of theoretical.

Example 8

A solution comprising 10 g/l of silver nitrate, 0.1 g/l of ferric nitrate, 40 g/l of cupric nitrate, 0.001 g/l of zinc nitrate and 0.015 g/l of aluminium nitrate is passed through a column containing 100 g of the electron-exchange complex-forming material obtained as described in Examples 1–7 at a rate of 500 ml/hr at room temperature. The filtrate comprises:

$Fe(NO_3)_3$ — 0.1 g/l,   $Cu(NO_3)_2$ — 39 g/l,
$Al(NO_3)_3$ — 0.015 g/l,   $Zn(NO_3)_2$ — 0.001 g/l.

Example 9

A chloride solution comprising 1.32 g/l of platinum, 4.05 g/l of palladium, 0.0049 g/l of iridium, 0.0382 g/l of rhodium, 0.0125 g/l of ruthenium, 0.098 g/l of gold, 10.5 g/l of cobalt, 6 g/l of nickel, 1.5 g/l of iron, 5 g/l of copper in the form of salts or complex compounds is passed through an adsorbing column containing 100 g of the complex-forming electron-exchange fibre obtained as described in Examples 1–3 at a rate of 500 ml per hour.

The filtrate comprises:
Ir — 0.0034 g/l, Rh — 0.026 g/l, Ru — 0.001 g/l, Au — 0.005 g/l, Co — 10.5 g/l, Ni — 6.0 g/l, Fe — 1.5 g/l,
Cu — 4.7 g/l.

Example 10

A chloride solution comprising 2.21 g/l of platinum, 6.257 g/l of palladium, 0.019 g/l of iridium, 0.771 mg/l of rhodium, 0.152 g/l of ruthenium, 0.098 g/l of gold, 10.5 g/l of cobalt, 6.0 g/l of nickel, 1.5 g/l of iron 5 g/l of copper is heated during 2 hrs with 5 g of the complex-forming electron-exchange material obtained as described in Examples 1–3, at a temperature of 100° C.

Said material with the adsorbed metals is filtered, dried and burned.

The filtrate comprises:
Co — 10.5 g/l, Ni — 6 g/l, Fe — 1.5 g/l, Cu — 4.7 g/l.

The residue after the burning comprises 99.8 wt. percent of metals from the group of platinum and gold and 0.2 wt. percent of ash.

Example 11

A sulphate solution comprising 0.0031 g/l of platinum, 0.0038 g/l of palladium, 0.0708 g/l of iridium, 0.0040 g/l of rhodium, 0.059 g/l of ruthenium, 1 g/l of gold, 90 g/l of nickel, 20 g/l of iron and 0.5 g/l of copper is heated with 5 g of the complex-forming electron-exchange material obtained as described in Examples 1, 3, 5, in an autoclave during 2 hours at a temperature of 120° C with 40 g/l of NaCl.

Said material is filtered, dried and burned.

The filtrate comprises:
Pt — 0.0002 g/l, Pd — 0.0001 g/l, Ir — 0.0003 g/l,

Rh — 0.0001 g/l, Ru — 0.0003 g/l, Au — 0.00001 g/l,
Ni — 90 g/l, Fe — 20 g/l, Cu — 0.49 g/l.

After burning a powder is obtained, comprising 99.8 wt. percent of metals from the group of platinum and gold and 0.2 wt. percent of ash.

Example 12

An aqueous solution comprising water-soluble compounds of mercury (50 mg/l) at pH = 5, is filtered through a column containing 5 g of the complex-forming electron-exchange material obtained as described in Examples 1 – 7, at a temperature of 20° C at a rate of 1,000 mg per hour. The filtrate contains no mercury.

What is claimed is:

1. Graft copolymers of cellulose and polyacrylthioamide of the general formula

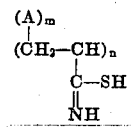

wherein A is cellulose,
- m is the degree of polymerization of cellulose and ranges from 150 to 2,000, and
- n is the degree of polymerization of polyacrylthioamide, and ranges from 400 to 4,000.

2. A method of producing graft copolymers of cellulose and polyacrylthioamide of the general formula

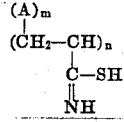

wherein A is cellulose,
- m is the degree of polymerization of cellulose and ranges from 150 to 2,000, and
- n is the degree of polymerization of polyacrylthioamide and ranges from 400 to 4,000, said method comprising contacting a graft copolymer of cellulose and polyacrylonitrile with hydrogen sulphide or with salts of hydrosulphuric acid in water or an organic solvent at a temperature of 60°–100° C, and isolating the target product.

3. A method as claimed in claim 2 wherein the process is carried out in an aqueous medium at a pH not above 8.

4. A method as claimed in claim 2 wherein said salts of hydrosulphuric acid are selected from the group consisting of sodium and ammonium sulphides and hydrosulphides, and the process is carried out in an aqueous medium.

5. A method as claimed in claim 2 wherein said salts of hydrosulphuric acid are ammonium hydrosulphides and the process is carried out in an organic medium.

6. A method as claimed in claim 2 wherein the organic solvent is selected from the group consisting of dimethyl formamide and dioxane.

* * * * *